United States Patent
Min et al.

(10) Patent No.: US 12,035,055 B2
(45) Date of Patent: Jul. 9, 2024

(54) IMAGE PROCESSING DEVICE AND IMAGE PROCESSING METHOD USING THE SAME

(71) Applicant: SAMSUNG ELECTRONICS CO., LTD., Suwon-si (KR)

(72) Inventors: Dong Ki Min, Seoul (KR); Jung Yeon Kim, Busan (KR); Keun Yung Byun, Hwaseong-si (KR); Tae Shick Wang, Hwaseong-si (KR); Jong Min You, Seongnam-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 0 days.

(21) Appl. No.: 18/056,839

(22) Filed: Nov. 18, 2022

(65) Prior Publication Data

US 2023/0254594 A1 Aug. 10, 2023

(30) Foreign Application Priority Data

Feb. 9, 2022 (KR) .......................... 10-2022-0016855

(51) Int. Cl.
*H04N 23/84* (2023.01)
*H04N 25/11* (2023.01)

(52) U.S. Cl.
CPC .......... *H04N 23/843* (2023.01); *H04N 25/11* (2023.01)

(58) Field of Classification Search
CPC ...... H04N 23/843; H04N 25/11; H04N 25/74; H04N 25/134; H04N 25/60; H04N 25/745; H04N 25/75; H04N 25/771; G06T 3/4007; G06T 3/4015; G06T 5/002

USPC ........................................................ 348/281
See application file for complete search history.

(56) References Cited

U.S. PATENT DOCUMENTS

| | | | |
|---|---|---|---|
| 8,189,064 B2 | 5/2012 | Kasahara | |
| 9,681,039 B2 | 6/2017 | Sasaki | |
| 9,996,902 B2 | 6/2018 | Milanfar et al. | |
| 10,306,164 B2 * | 5/2019 | Ajito ..................... | H04N 25/61 |
| 10,567,647 B2 | 2/2020 | Kishine | |

(Continued)

FOREIGN PATENT DOCUMENTS

| | | | |
|---|---|---|---|
| JP | 2008042391 | * | 2/2008 |
| JP | 2013218523 | | 10/2013 |
| JP | 2015201724 | | 11/2015 |

*Primary Examiner* — Lin Ye
*Assistant Examiner* — Chan T Nguyen
(74) *Attorney, Agent, or Firm* — F. Chau & Associates, LLC

(57) ABSTRACT

An image processing device comprises an image sensor including unit groups comprising a reference group and a conversion group each including pixels and color filters, and is configured to generate image data using the pixels, and an image signal processor which is configured to calculate a hash of the image data, and to select a filter corresponding to the hash to perform filtering, wherein the image signal processor includes a pixel index converter which is configured to convert indexes of the pixels based on a positional relationship between the pixels, a pixel property converter which is configured to convert the properties of the pixels and to convert the hash before conversion, and a filter coefficient converter which is configured to convert filter coefficients of the pixels based on the respective converted pixel index and the respective converted pixel property.

20 Claims, 12 Drawing Sheets

(56) References Cited

U.S. PATENT DOCUMENTS

2011/0090351 A1* 4/2011 Cote .................. G06T 5/94
 348/208.1
2014/0044374 A1* 2/2014 Terasawa ............. H04N 23/843
 382/254

\* cited by examiner

IMAGE PROCESSING DEVICE AND IMAGE PROCESSING METHOD USING THE SAME

CROSS-REFERENCE TO RELATED APPLICATION

This application claims priority under 35 U.S.C. § 119 to Korean Patent Application No. 10-2022-0016855 filed on Feb. 9, 2022 in the Korean Intellectual Property Office, the disclosure of which is herein incorporated by reference in its entirety.

TECHNICAL FIELD

The present disclosure relates to an image processing device and an image processing method using the same.

DISCUSSION

An image sensor is a type of semiconductor element that is configured to convert optical information into an electric signal. Such an image sensor may include a charged coupled device (CCD) image sensor or a complementary metal-oxide semiconductor (CMOS) image sensor.

Since the image sensor senses brightness information of light, a color filter array (CFA) that allows a specific color component to pass may be placed for each pixel of the image sensor to detect that color component's information. Since one color component's information corresponding to a specific color filter is acquired for each pixel of the image sensor, an image signal processor may calculate substantially all of the other types of color component information of the pixels from the color information of the peripheral pixels through an interpolation.

Recently, as interest in high-resolution images has increased, various techniques for high-resolution imaging with higher image quality have been developed. In this case, the number of filters used in a de-mosaic process may increase, and therefore there is a desire to reduce the memory for storing the coefficients of the filters by reducing the number of filters.

SUMMARY

Embodiments of the present disclosure may provide an image processing device that generates a relatively high-quality image using a relatively small memory.

Embodiments of the present disclosure may provide an image processing method for generating a relatively high-quality image using a relatively small memory.

According to an embodiment of the present disclosure, an image processing device comprises: an image sensor having a plurality of unit groups, each unit group comprising a reference group and a conversion group each including a plurality of pixels and a plurality of color filters, the image sensor configured to generate image data using the plurality of pixels; and an image signal processor configured to calculate a hash of the image data, and to select a filter corresponding to the hash to perform filtering, wherein the image signal processor includes: a pixel index converter configured to convert indexes of the plurality of pixels based on a positional relationship between the plurality of pixels, a pixel property converter configured to convert the hash and properties of the plurality of pixels, and a filter coefficient converter configured to convert filter coefficients of the plurality of pixels based on the respective converted pixel index and the respective converted pixel property.

According to an embodiment of the present disclosure, an image processing device comprises: an image sensor which includes a plurality of unit groups comprising a center group and a peripheral group each including a plurality of pixels and a plurality of color filters; and an image signal processor which is configured to calculate a hash of a pixel property based on brightness or slope information of a raw image generated from the plurality of pixels, wherein the image signal processor includes a pixel index converter which is configured to convert indexes of the plurality of pixels using a positional relationship between the plurality of pixels, a pixel property converter which is configured to convert the properties of the plurality of pixels, and a filter coefficient converter which is configured to convert filter coefficients of the plurality of pixels based on the respective converted pixel index and the respective converted pixel property, wherein the filter of the center group corresponding to the calculated hash is configured to be applied to the converted pixel index and pixel property to perform filtering.

According to an embodiment of the present disclosure, an image processing method of an image processing device comprises: an image sensor made up of a reference group and a conversion group each including a plurality of pixels and a plurality of color filters, and an image signal processor which calculates a hash of a pixel property based on brightness or slope information of a raw image generated from the plurality of pixels to perform filtering, wherein the image signal processor converts a pixel index of the conversion group into a pixel index of the reference group based on a positional relationship between the plurality of pixels, wherein the image signal processor converts pixel properties for the plurality of pixels of the conversion group into pixel properties for the plurality of pixels of the reference group based on the positional relationship between the plurality of pixels, and wherein the image signal processor converts filter coefficients of the plurality of pixels based on the respective converted pixel index and the respective converted pixel property.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

BRIEF DESCRIPTION OF THE DRAWINGS

The above and other embodiments of the present disclosure will become more apparent by describing embodiments thereof in detail with reference to the attached drawings, in which.

DETAILED DESCRIPTION

Hereinafter, embodiments of the present disclosure will be described in detail with reference to the accompanying drawings. An image processing device will be described with reference to FIGS. 1 to 6.

Figure 1:
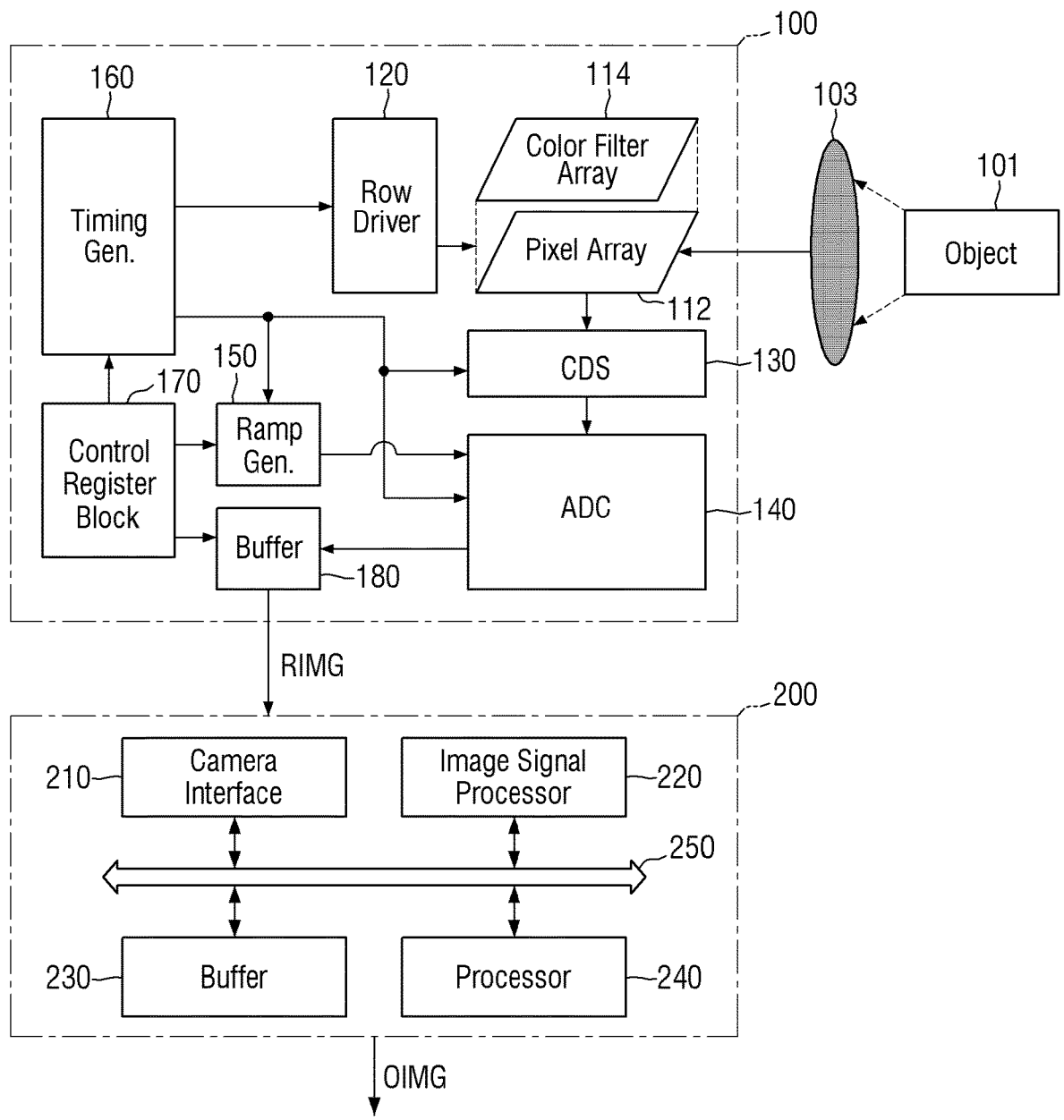
FIG. 1 is a block diagram for explaining the image processing device according to some embodiments.
Figure 2:
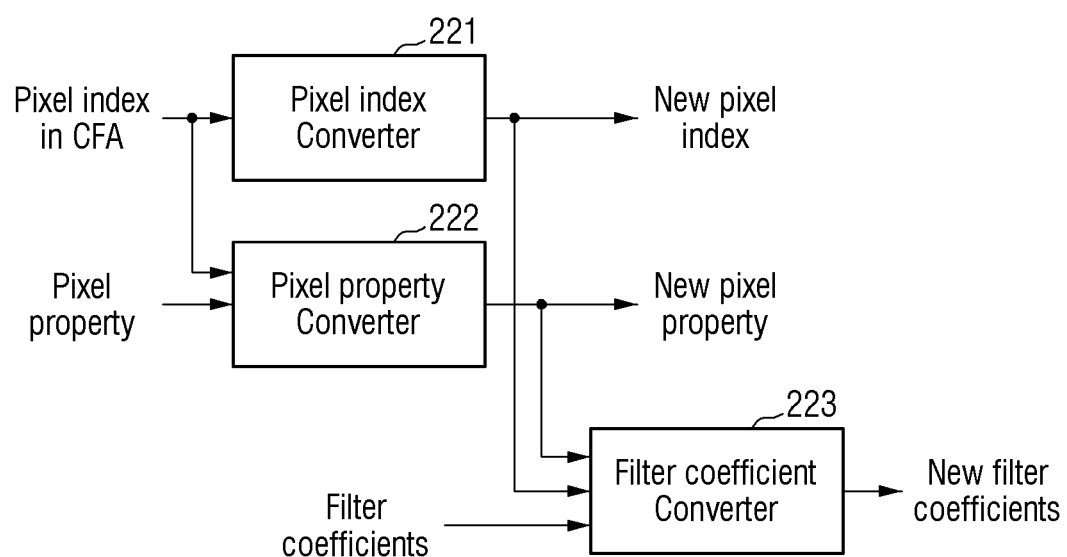
FIG. 2 is a block diagram for explaining an image signal processor of the image processing device of FIG. 1.
Figure 3:
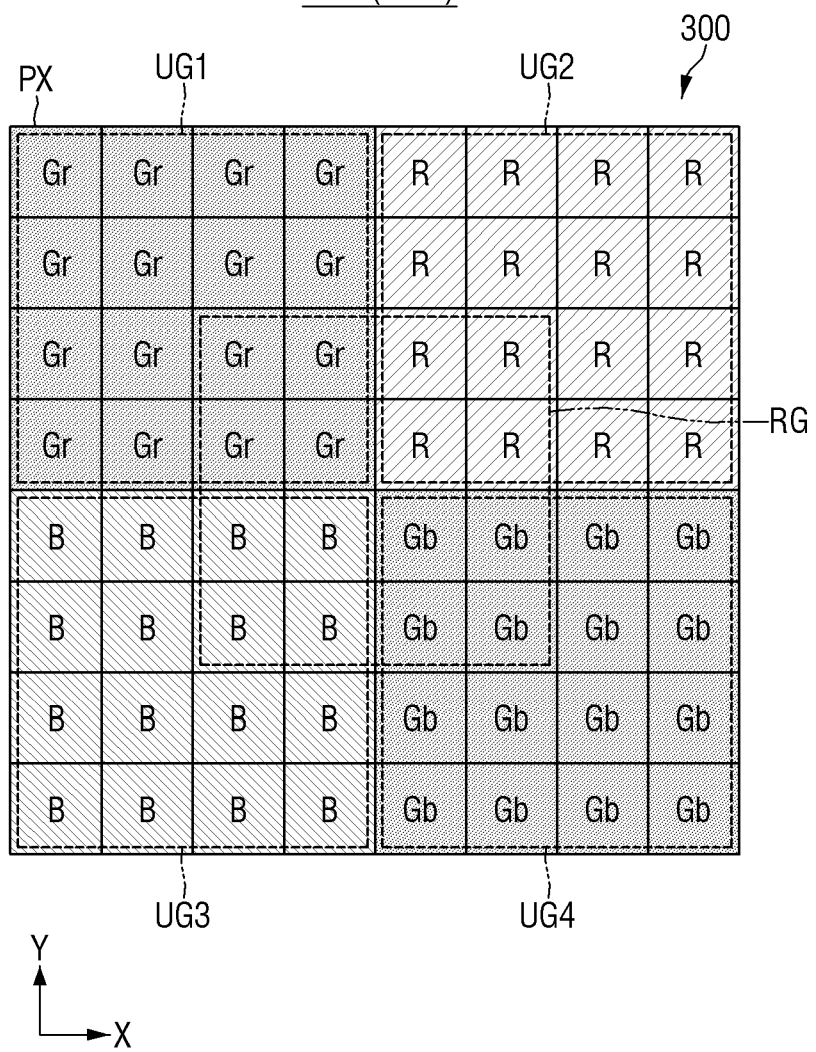
FIG. 3 is a layout diagram for explaining a pixel array and a color filter array according to some embodiments.
Figure 4:
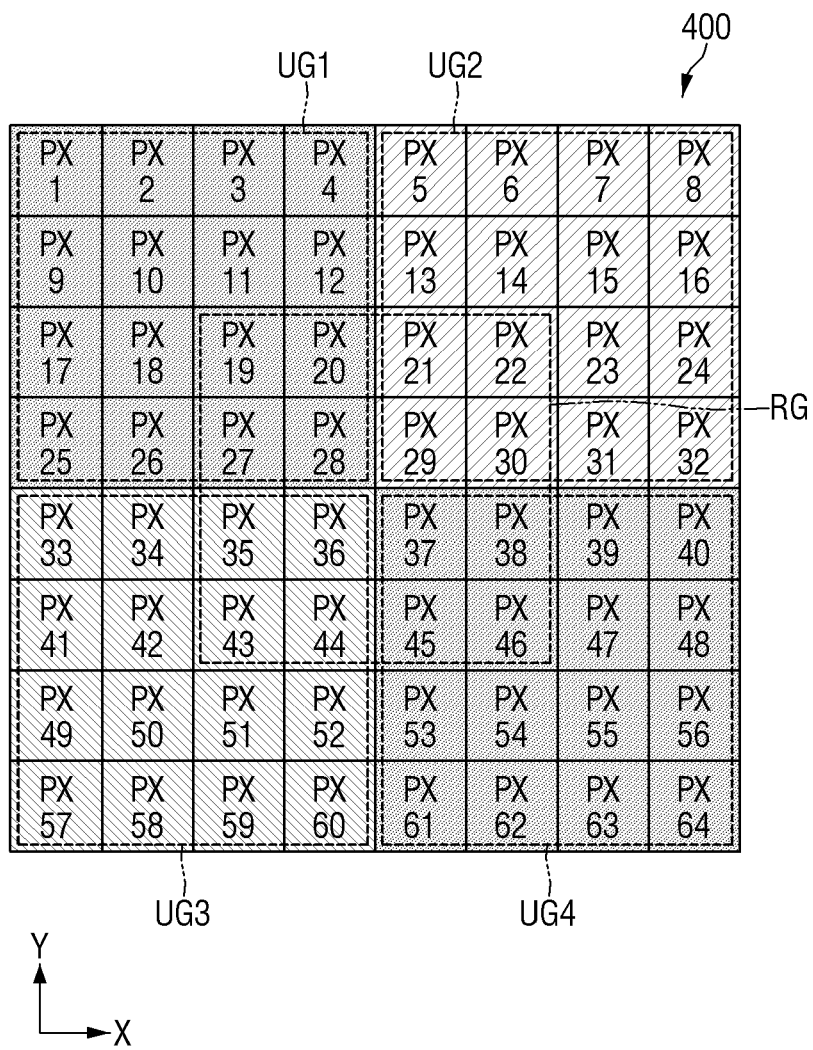
FIG. 4 is a layout diagram for explaining the setting of a pixel index of the pixel array of FIG. 3.
Figure 5:
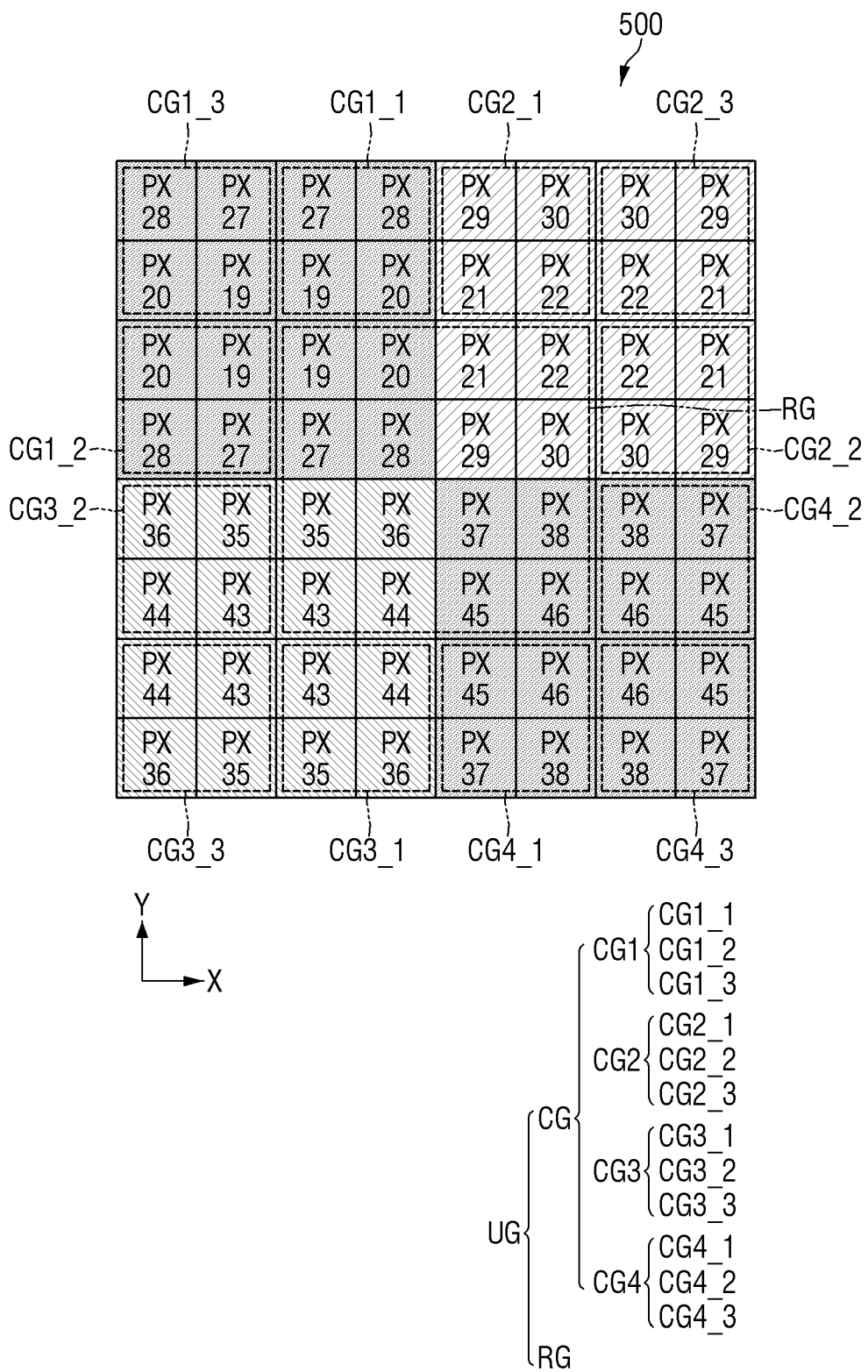
FIG. 5 is a layout diagram for explaining that the pixel index of the pixel array according to some embodiments is converted.
Figure 6:
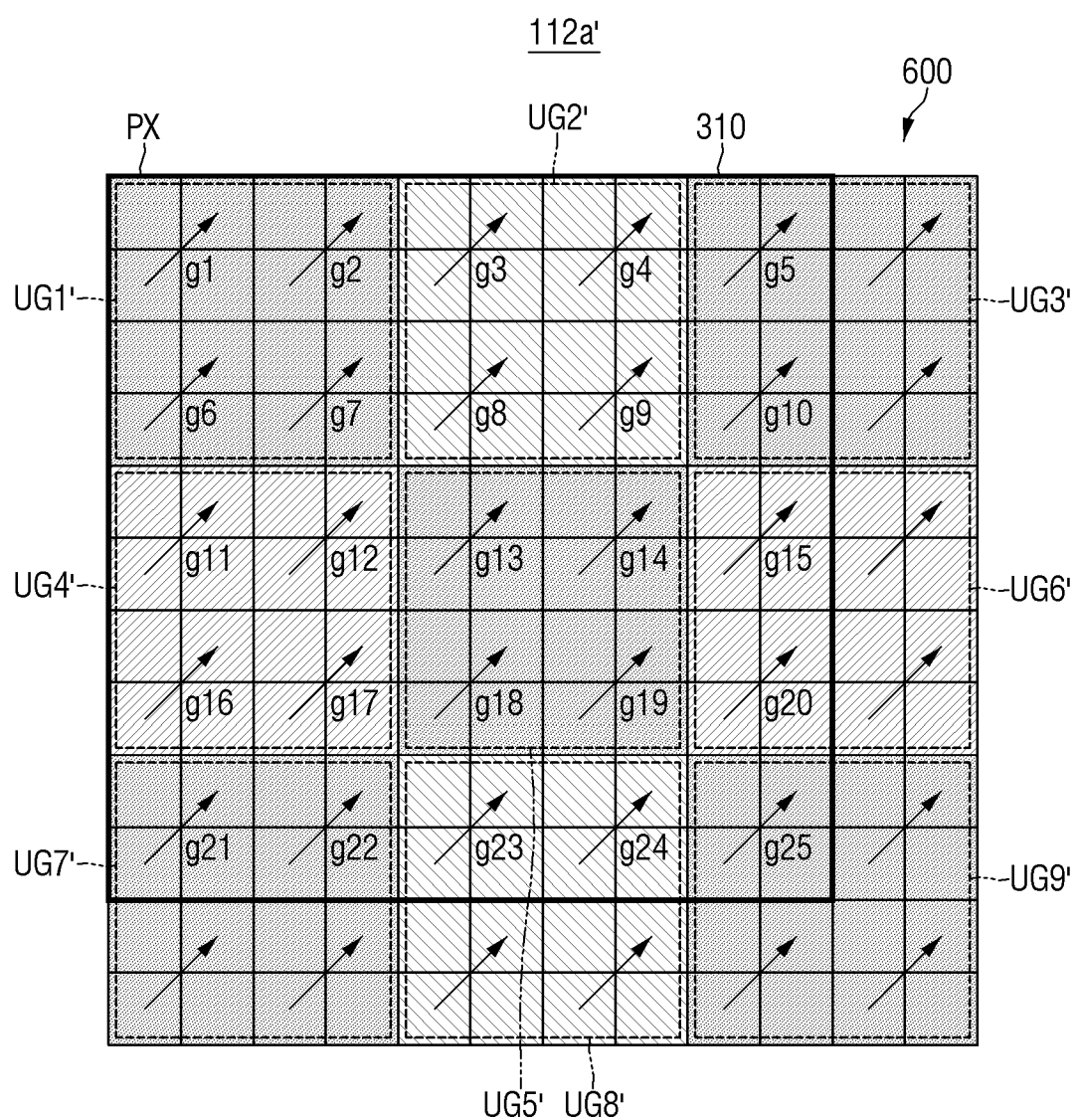
FIG. 6 is a layout diagram for explaining the pixel property converted by a pixel property converter of FIG. 2.

FIG. 1 is referenced for explaining the image processing device according to some embodiments. FIG. 2 is referenced for explaining an image signal processor of the image processing device of FIG. 1. FIG. 3 is referenced for explaining a pixel array and a color filter array according to some embodiments. FIG. 4 is referenced for explaining the setting of a pixel index of the pixel array of FIG. 3. FIG. 5 is referenced for explaining that the pixel index of the pixel array according to some embodiments is converted. And FIG. 6 is referenced for explaining the pixel property converted by a pixel property converter of FIG. 2.

Referring to FIG. 1, the image processing device 1 according to an embodiment may include an image sensor 100 and an application processor (AP) 200. The image processing device 1 may be implemented as a portable electronic device, for example, a digital camera, a camcorder, a mobile phone, a smart phone, a tablet PC (tablet personal computer), a PDA (personal digital assistant), a mobile internet device (MID), a wearable computer, an Internet of Things (IoT) device, or an Internet of Everything (IoT) device.

The image sensor 100 may sense an object 101 imaged through a lens 103 by the control of the application processor 200. The image sensor 100 may convert the optical signal of the object 101 incident through the lens 103 into an electric signal, using a light sensing element (or a photo-electric conversion element), generate image data based on the electric signal, and output the image data.

The image sensor 100 may include a pixel array 112, a row driver 120, a correlated double sampling (CDS) block 130, an analog digital converter (ADC) block 140, a ramp signal generator 150, a timing generator 160, a control register block 170, and a buffer 180.

The pixel array 112 may include a plurality of pixels arranged in the form of a matrix. Each of the plurality of pixels may sense light using a light sensing element, and convert the sensed light into a pixel signal which is an electric signal. For example, the light sensing element may be a photo diode, a photo transistor, a photo gate, a pinned photo diode (PPD) or a combination thereof. Each of the plurality of photosensitive elements may have a 4-transistor structure including a photo diode, a transfer transistor, a reset transistor, an amplification transistor, and a selection transistor. According to an embodiment, each of the plurality of light sensing elements may have a 1-transistor structure, a 3-transistor structure, or a 5-transistor structure, or a structure in which a plurality of pixels share some transistors.

The color filter array 114 may be placed on the pixel array 112.

The row driver 120 may activate each of the plurality of pixels according to the control of the timing generator 160. For example, the row driver 120 may drive the pixels implemented on the pixel array 112 in units of rows. For example, the row driver 120 may generate control signals that may control the operation of a plurality of pixels included in each of the plurality of rows.

The pixel signal that is output from each of the plurality of pixels is transmitted to the correlated double sampling block 130 according to the control signals.

The correlated double sampling block 130 may include a plurality of CDS circuits. Each of the plurality of CDS circuits performs the correlated double sampling on the pixel values that are output from each of the plurality of column lines implemented on the pixel array 112 in response to at least one switch signal output from the timing generator 160, and may output a plurality of comparison signals by comparing the correlated double sampled pixel values with the ramp signal output from the ramp signal generator 150.

The analog digital converter block 140 may convert each of the plurality of comparison signals output from the correlated double sampling block 130 into digital signals, and output the plurality of digital signals to the buffer 180.

The timing generator 160 may generate a signal that serves as a reference for the operation timing of various components of the image sensor 100. The operation timing reference signal generated by the timing generator 160 may be transferred to the row driver 120, the correlated double sampling block 130, the analog digital converter block 140, and the ramp signal generator 150.

The control register block 170 may generally control the operation of the image sensor 100. The control register block 170 may control the operation of the ramp signal generator 150, the timing generator 160, and the buffer 180.

The buffer 180 may output raw image data RIMG corresponding to a plurality of digital signals that are output from the analog digital converter block 140.

The application processor 200 may include a camera interface 210, an image signal processor 220, a buffer 230, and a processor 240.

The application processor 200 may receive the raw image data RIMG as input image data through the camera interface 210. The camera interface 210 may support data movement between the image sensor 100 and the application processor 200.

The image signal processor 220 may process the raw image data RIMG provided from the image sensor 100 and output the output image data OIMG. The image signal processor 220 may output the output image data OMG by performing various at least one computation on the raw image data RIMG. For example, at least one computation may include cross-talk compensation, bad pixel correction, merging or reconstruction of multiple exposure pixel, demosaicing, noise reduction, image sharpening, image stabilization, color space conversion, compression, and the like. However, the scope of the present disclosure is not limited thereto.

In some embodiments, the raw image data RIMG may relate to the brightness information of the raw image generated from the plurality of pixels. The image signal processor 220 may calculate the hash with respect to the pixel property based on information such as brightness or slope of the raw image, and apply the hash to an interpolation filter.

The buffer 230 may provide a space that may temporarily store the data. For example, the image signal processor 220 may temporarily store the image data in the buffer 230 as needed. Further, the buffer 230 may be loaded with a program executed by the processor 240, or may store data used by the program.

The buffer 230 may be implemented by, for example, a SRAM (Static Random Access Memory), a DRAM (Dynamic Random Access Memory), or the like, but the scope of the present disclosure is not limited thereto, and it may be implemented as a non-volatile memory as needed.

The processor 240 may generally control the application processor 200. In particular, the processor 240 may execute a program including instructions for operating various elements of the application processor 200 as well as the image signal processor 220.

Although the processor 240 may be implemented as, for example, a CPU (Central Processor), a GPU (Graphic Processor), or the like, the scope of the present disclosure is not limited thereto.

The internal bus 250 may serve as a passage that allows elements inside the application processor 200, that is, the camera interface 210, the image signal processor 220, the buffer 230, the processor 240, and the like to exchange data with each other. Although the internal bus 290 may be implemented as, for example, an AXI (Advanced eXtensible Interface) according to, for example, an AMBA (Advanced Microcontroller Bus Architecture), the scope of the present disclosure is not limited thereto.

Referring to FIG. 2, the image signal processor 220 may include a pixel index converter 221, a pixel property converter 222, and a filter coefficient converter 223.

The pixel index converter 221 may convert the indexes of a plurality of pixels PX, using a positional relationship between the plurality of pixels PX. The pixel index converter 221 may convert a pixel PX index of a conversion group CG into a pixel PX index of a reference group RG, using the aforementioned positional relationship.

For example, the positional relationship may be any one of an x-flip, a y-flip, and a rotation relationship, or a combination thereof. For example, the image signal processor 220 may be implemented as hardware such as a CPU (Central Processor) and a GPU (Graphic Processor). Further, for example, the image signal processor 220 may be implemented as software. In this case, the software may be stored on a computer-readable non-temporarily readable recording medium. Further, in this case, the software may be provided by an OS (Operating System) or may be provided by a predetermined application.

Referring to FIG. 3, an array assembly 300 according to an embodiment includes a pixel array 112a that may include a plurality of unit groups UG1 to UG4 including a plurality of pixels PX. For example, the plurality of unit groups UG1 to UG4 may be regularly arranged along a first direction X and/or a second direction Y. In some embodiments, the first direction X may mean an X-axis direction, and the second direction Y may mean a Y-axis direction.

A color filter array 114a may be placed on the pixel array 112a. The color filter array 114a may include a plurality of unit groups UG1, UG2, UG3 and UG4. Each of the unit groups UG1, UG2, UG3 and UG4 may include color filters of the same color arranged in an M*N matrix, where M and N are natural numbers. For example, each of the unit groups UG1, UG2, UG3 and UG4 may include color filters of the same color arranged in a 4*4 matrix. Each color filter may be placed to correspond to each plurality of pixels PX. For example, each of the unit groups UG1, UG2, UG3 and UG4 may be placed on the pixel PX arranged in a 4*4 matrix among the plurality of pixels PX.

The plurality of unit groups UG1, UG2, UG3 and UG4 may include, for example, a first unit group UG1 and a second unit group UG2 adjacent to each other in the first direction X, and a third unit group UG3 and a fourth unit group UG4 adjacent to each other in the first direction X. The first unit group UG1 and the third unit group UG3 may be adjacent to each other in the second direction Y, and the second unit group UG2 and the fourth unit group UG4 may be adjacent to each other in the second direction Y. The second direction Y may intersect the first direction X. The first unit group UG1 includes a first color filter Gr, the second unit group UG2 includes a second color filter R, the third unit group UG3 includes a third color filter B, and the fourth unit group UG4 may include a fourth color filter Gb. The first and fourth color filters Gr and Gb may be green color filters, the second color filter R may be a red color filter, and the third color filter B may be a blue color filter.

On the other hand, in some embodiments, although the color pixels are described as RGB pixels, the color pixels are not necessarily limited to RGB pixels. As the color pixels, CMY pixels may also be used in addition to the RGB pixels. Further, a white pixel having an infrared ray blocking function or an infrared ray passing function may also be used.

A plurality of micro-lenses may be placed on the plurality of pixels PX. Each microlens may cover each pixel PX.

Referring to FIG. 4, an array assembly 400 includes pixel indexes PX1 to PX64 that may be set for each of the plurality of pixels PX of the plurality of unit groups UG1 to UG4. Each of the pixel PX properties, for example, a slope property as described later may be calculated for each of the pixel indexes PX1 to PX64. The image signal processor 220 may quantize the pixel PX properties corresponding to the pixel indexes PX1 to PX64 and assign the quantized properties to a particular hash.

For example, a particular hash, that is, a first hash, may be assigned to the quantized pixel property corresponding to a seventeenth pixel index PX17 of FIG. 4. On the other hand, as will be described later, since the arrangement of the color filters of the plurality of unit groups UG1 to UG4 may be different, the number of the plurality of pixels PX and the number of the pixel indexes PX1 to PX64 to be set may also differ from those shown in FIG. 4.

Referring to FIG. 5, an array assembly 500 includes the plurality of unit groups UG1 to UG4 that may include a reference group RG of a central portion and a conversion group CG of a peripheral portion. In some embodiments, the reference group RG may be referred to as a central group, and the conversion group CG may be referred to as a peripheral group.

The first unit group UG1 may include substantially all of the pixels PX of the first conversion group CG1 and some of the pixels PX of the reference group RG. The second unit group UG2 may include substantially all of the pixels PX of the second conversion group CG2 and some of the pixels PX of the reference group RG. The third unit group UG3 may include substantially all of the pixels PX of the third conversion group CG3 and some of the pixels PX of the reference group RG. The fourth unit group UG4 may include substantially all of the pixels PX of the fourth conversion group CG4 and a some of the pixels PX of the reference group RG.

Each conversion group CG may include a plurality of conversion regions. In particular, the first conversion group CG1 may include first_1 to first_3 conversion regions CG1_1, CG1_2, and CG1_3. The second conversion group CG2 may include second_1 to second_3 conversion regions CG2_1, CG2_2, and CG2_3. The third conversion group CG3 may include third_1 to third_3 conversion regions CG3_1, CG3_2, and CG3_3. The fourth conversion group CG4 may include fourth_1 to fourth_3 conversion regions CG4_1, CG4_2, and CG4_3.

The first_1 to fourth_1 conversion regions CG1_1, CG2_1, CG3_1, and CG4_1 may be regions in which conversion is performed using a first positional relationship (x-flip). The first_2 to fourth_2 conversion regions CG1_2, CG2_2, CG3_2, and CG4_2 may be regions in which conversion is performed using a second positional relationship (y-flip). The first_3 to fourth_3 conversion regions CG1_3, CG2_3, CG3_3, and CG4_3 may be regions in which conversion is performed using a third positional relationship (x-flip & y-flip).

The pixel index converter 221 may convert the pixel index of the conversion group CG into the corresponding pixel index of the reference group RG, using the positional relationship between the pixels PX.

In particular, the pixel index converter 221 may convert each pixel index of the first conversion group CG1 into corresponding pixel index of the reference group RG, using the first to third positional relationships (x-flip, y-flip, x-flip & y-flip). In greater detail, the pixel index converter 221 may convert any one pixel index of the first_1 conversion region CG1_1 of the first conversion group CG1 into corresponding pixel index of the reference group RG, using the first positional relationship (x-flip). The pixel index converter 221 may convert any one pixel index of the first_2 conversion region CG1_2 of the first conversion group CG1 into the corresponding pixel index of the reference group RG, using the second positional relationship (y-flip). The pixel index converter 221 may convert any one pixel PX index of the first_3 conversion regions CG1_3 of the first conversion group CG1 into the corresponding pixel index of the reference group RG, using the third positional relationship (x-flip & y-flip). On the other hand, such a conversion of the pixel index may be performed, using modulo functions.

For example, the seventeenth pixel index PX17 of the first conversion group CG1 of FIG. 4 may be converted into a twelfth pixel index PX20 which is a corresponding pixel index of the reference group RG, using the second positional relationship (y-flip) as shown in FIG. 5.

Similarly, the pixel index converter 221 may convert pixel PX indexes of each of the second to fourth conversion groups CG2, CG3, and CG4 into the corresponding pixel PX index of the reference group RG, using the first to third positional relationships (x-flip, y-flip, x-flip & y-flip).

The pixel property converter 222 may convert the properties of the plurality of pixels PX. The pixel property converter 222 may convert the pixel PX property of the conversion group CG into the pixel PX property of the reference group RG, using the above-mentioned positional relationship.

Referring to FIG. 6, an array assembly 600 includes the pixel property converter 222 that may convert the properties of the plurality of pixels PX related to a gradient vector of the pixel PX center values included in the plurality of unit groups UG1, UG2, UG3, and UG4. For example, the properties of the pixel PX may mean the properties of the gradient vector, that is, a directional property, a strength property, and/or a coherence property. Alternatively, the property of the pixel PX may include a brightness property.

For example, the property of the pixel PX may be calculated as follows. One vector may be generated as in the following formula (1), by aggregating n gradient vectors (e.g., g1 to g25 of FIG. 6) calculated in a window 310 of a particular size of a pixel array 112a' including the plurality of unit groups UG1' to UG9' of FIG. 6.

$$G = \begin{bmatrix} g_{x1} & g_{y1} \\ g_{x2} & g_{y3} \\ \vdots & \vdots \\ g_{xn} & g_{yn} \end{bmatrix} \quad \text{Formula (1)}$$

A 2×2 matrix of $G^T W G$ is calculated in consideration of the weights of the central gradient vector (W is a diagonal weighting matrix of n×n), and an eigen-values $\lambda_1, \lambda_2 (\lambda_1 \geq \lambda_2)$ and their corresponding eigen-vectors $\phi 1=[\phi_{x1},\phi_{y1}]^T$ and $\phi_2=[\phi_{x2}, \phi_{y2}]^T$ may be calculated. The property of the gradient vector represented by the window 310 of the particular size, that is, the direction θ, the strength δ and coherence μ of the vector may be calculated by the following formula (2).

$$\theta = \arctan(\phi_{y1}, \phi_{x1}) \quad \text{Formula (2)}$$
$$\delta = \sqrt{\lambda_1}$$
$$\mu = \frac{\sqrt{\lambda_1} - \sqrt{\lambda_2}}{\sqrt{\lambda_1} + \sqrt{\lambda_2}}$$

The image signal processor 220 may calculate the hash by quantizing the pixel PX property calculated in this way with a specific reference.

The filter coefficient converter 223 may convert the filter coefficients of the plurality of pixels PX according to the converted pixel PX index and the pixel PX property. The filter coefficient converter 223 may convert the filter coefficient of the conversion group CG into the filter coefficient of the reference group RG, using the above-mentioned positional relationship.

Figure 7:
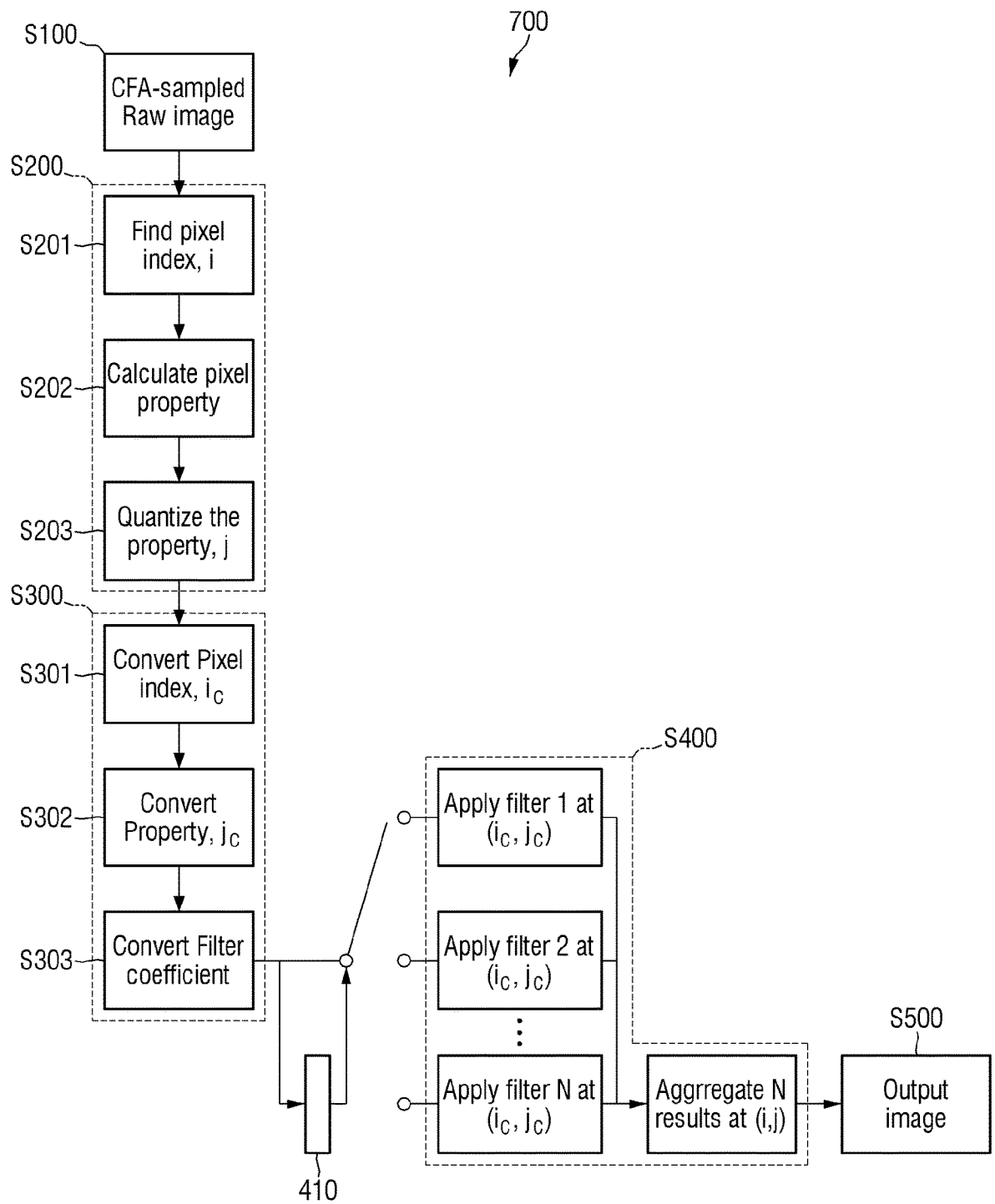
FIG. 7 is a flowchart diagram for explaining the image processing method according to some embodiments.

Referring to FIG. 7, a flowchart 700 is used for explaining an image processing method according to an embodiment.

First, the image signal processor 220 may input the sampled raw image RIMG from the image sensor 100 (S100).

The image signal processor 220 may set the pixel PX index included in a particular kernel or window of the raw image RIMG, quantize the pixel PX property, and assign it to a particular hash (S200). In particular, the image signal processor 220 may find and set the pixel index (i) for the particular pixel PX of the conversion group CG (S201). The image signal processor 220 may calculate the pixel PX property, for example, a slope property (S202). The image signal processor 220 may assign the quantized slope property (j) to the first hash (S203).

After that, the image signal processor 220 may select a filter, using the hash (S300). In particular, the pixel index converter 221 may convert (i_c) the pixel PX index of the conversion group CG into the pixel PX index of the reference group RG, using a particular positional relationship (S301). The pixel property converter 222 may convert the slope property (j) into a slope property (j_c) of the reference group RG, using the particular positional relationship (S302). At this time, the first hash may also be converted into the second hash, using the particular positional relationship. After that, the second hash may be calculated and reassigned as the first hash, using the aforementioned particular positional relationship. The filter coefficient converter 223 may convert the filter coefficient of the pixel PX according to the converted pixel index (i_c) and the slope property (j_c) (S303).

The image signal processor 220 may apply the filter of the reference group RG corresponding to the calculated first hash to the converted pixel index ($i_c$) and the converted slope property ($j_c$). The image signal processor 220 may perform filtering, by selecting a filter optimized for a particular hash from among N filters to apply an interpolation filter. In this case, the filter optimized for a particular hash may be selected by the selector 410. After that, the converted result may be aggregated and stored in the memory inside the application processor 200 (S400).

After that, the output image OIMG may be output by the application processor 200 (S500).

In some embodiments, a machine learning-based image processing device, which generates a hash on the basis of information such as brightness or slope of the raw image generated from the pixel PX, selects a filter on the basis of the hash, and performs a demosaic process using such a filter, may be provided. In this case, a large number of filters are required for each property or hash of the pixel PX, and there may be a desire to reduce the number of filters to reduce the number of memories.

According to some embodiments, the number of filters may be reduced by recycling the filters used in the demosaic process, using the reference group RG. In particular, the number of filters may be reduced by utilizing a positional relationship between the plurality of pixels PX of the reference group RG and the conversion group CG. For example, when each of the unit groups UG1, UG2, UG3, and UG4 includes the color filters of the same color arranged in a 4*4 matrix, the number of filters may be reduced from the conventional 64 to 16. As a result, it is possible to provide an image processing device and an image processing method that generate an image of the same quality, while using a small number of memories.

Figure 8:
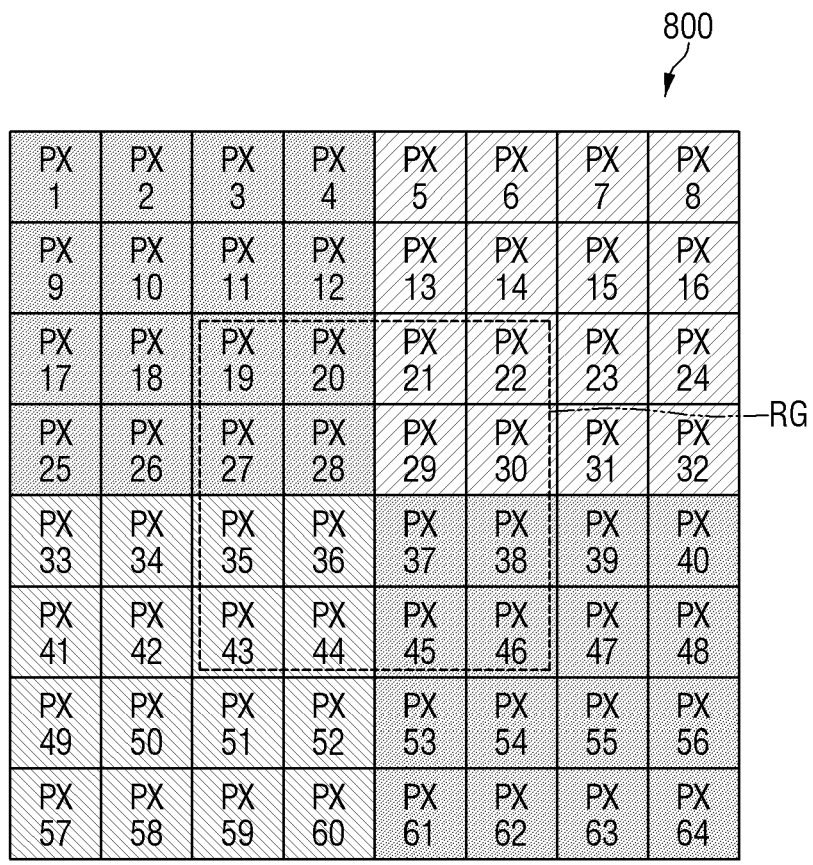
FIG. 8 is a layout diagram for explaining that the pixel index of a pixel array according to some embodiments is converted.

Referring to FIG. 8, an array assembly 800 is used for explaining how the pixel index of a pixel array according to an embodiment is converted. For convenience of explanation, duplicate description of substantially similar parts or contents described using FIGS. 1 to 7 may be omitted or simplified.

The pixel index converter 221 may convert the index of the pixel PX, using the internal positional relationship of the plurality of pixels PX of the reference group RG. In particular, the pixel index converter 221 may convert the first pixel index of the reference group RG into the second pixel index of the reference group RG, using a positional relationship different from that described using FIGS. 1 to 7.

The pixel index converter 221 may convert the indexes of a plurality of pixels PX of the reference group RG, using the positional relationship based on a diagonal direction A. For example, the index of the pixel PX located on one side on the basis of the diagonal direction A may be converted into the index of the pixel PX located on the other side. In this case, a forty-sixth pixel index PX46 may be converted referring to a nineteenth pixel index PX19, a thirtieth pixel index PX30 may be converted referring to a twenty-first pixel index PX21, and a forty-fourth pixel index PX44 may be converted referring to a thirty-fifth pixel index PX35, respectively.

In this case, the number of filters may be further reduced from the conventional 64 to 10.

Figure 9:
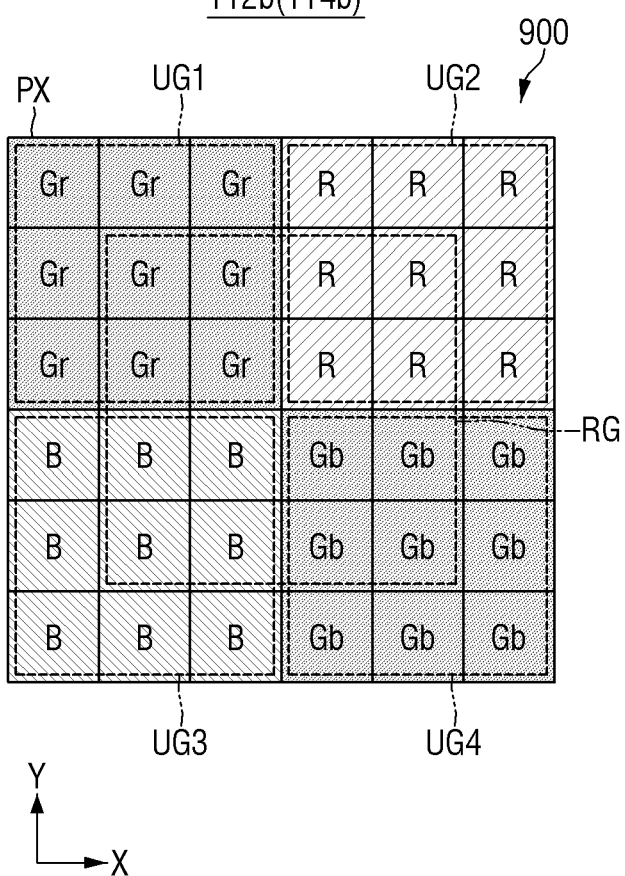
FIG. 9 is a layout diagram for explaining the pixel array and the color filter array according to some embodiments.
Figure 10:
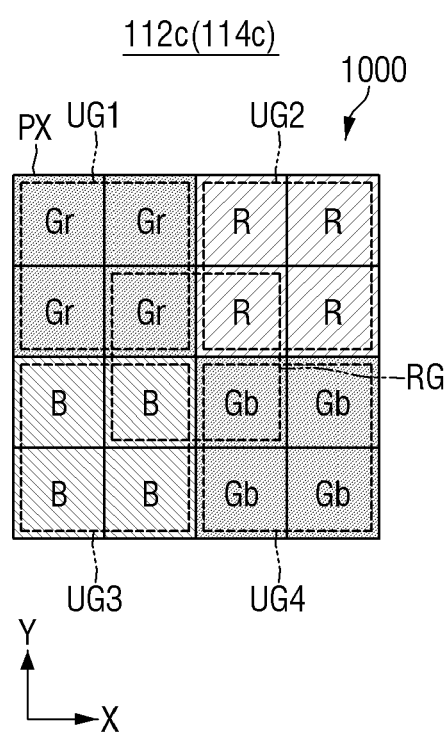
FIG. 10 is a layout diagram for explaining the pixel array and the color filter array according to some embodiments.

FIG. 9 is used for explaining the pixel array and the color filter array according to an embodiment. FIG. 10 is used for explaining the pixel array and the color filter array according to some embodiments. For convenience of explanation, duplicate description of substantially similar parts or contents described using FIGS. 1 to 8 may be omitted or simplified.

Referring to FIG. 9, an array assembly 900 includes a plurality of unit groups UG1 to UG4 that may include the color filters arranged in a 3*3 matrix. Each color filter may be placed to correspond to each plurality of pixels PX. For example, each of the unit groups UG1 to UG4 may be placed on the pixel PX arranged in a 3*3 matrix among the plurality of pixels PX.

A pixel index may be set for each of the plurality of pixels PX of the plurality of unit groups UG1 to UG4. In this case, each pixel property, for example, a slope property, may be calculated for each of the thirty-six pixel indexes. The image signal processor 220 may quantize the pixel property corresponding to each of the thirty-six pixel indexes and assign the quantized properties to a particular hash.

The plurality of unit groups UG1 to UG4 may include a reference group RG of the central portion and a conversion group CG of the peripheral portion. Each conversion group CG may include a plurality of conversion regions. The pixel index converter 221 may convert the pixel index of each conversion group CG into the corresponding pixel index of the reference group RG, using the positional relationship between the pixels PX. For example, the pixel index converter 221 may convert each pixel index of the first conversion group CG1 into the corresponding pixel index of the reference group RG, using the first to third positional relationships (x-flip, y-flip, or x-flip & y-flip). Similarly, the pixel index converter 221 may convert each pixel index of the second to fourth conversion groups CG2, CG3, and CG4 into the corresponding pixel index of the reference group RG, using the first to third positional relationships (x-flip, y-flip, or x-flip & y-flip).

Referring to FIG. 10, an array assembly 1000 includes a plurality of unit groups UG1 to UG4 that may include the color filters arranged in a 2*2 matrix. Each color filter may be placed to correspond to each plurality of pixels PX. For example, each of the unit groups UG1 to UG4 may be placed on the pixel PX arranged in a 2*2 matrix among the plurality of pixels PX.

A pixel index may be set for each of the plurality of pixels PX of the plurality of unit groups UG1 to UG4. In this case, each pixel property, for example, a slope property, may be calculated for each of the sixteen pixel indexes. The image signal processor 220 may quantize each pixel property corresponding to the sixteen pixel indexes and assign it to a particular hash.

The plurality of unit groups UG1 to UG4 may include a reference group RG of the central portion and a conversion group CG of the peripheral portion. Each conversion group CG may include a plurality of conversion regions. The pixel index converter 221 may convert the pixel index of each conversion group CG into the corresponding pixel index of the reference group RG, using the positional relationship between the pixels PX. For example, the pixel index converter 221 may convert each pixel index of the first conversion group CG1 into the corresponding pixel index of the reference group RG, using the first to third positional relationships (x-flip, y-flip, or x-flip & y-flip). Similarly, the pixel index converter 221 may convert each pixel index of the second to fourth conversion groups CG2, CG3, and CG4 into the corresponding pixel index of the reference group RG, using the first to third positional relationships (x-flip, y-flip, or x-flip & y-flip).

Figure 11:
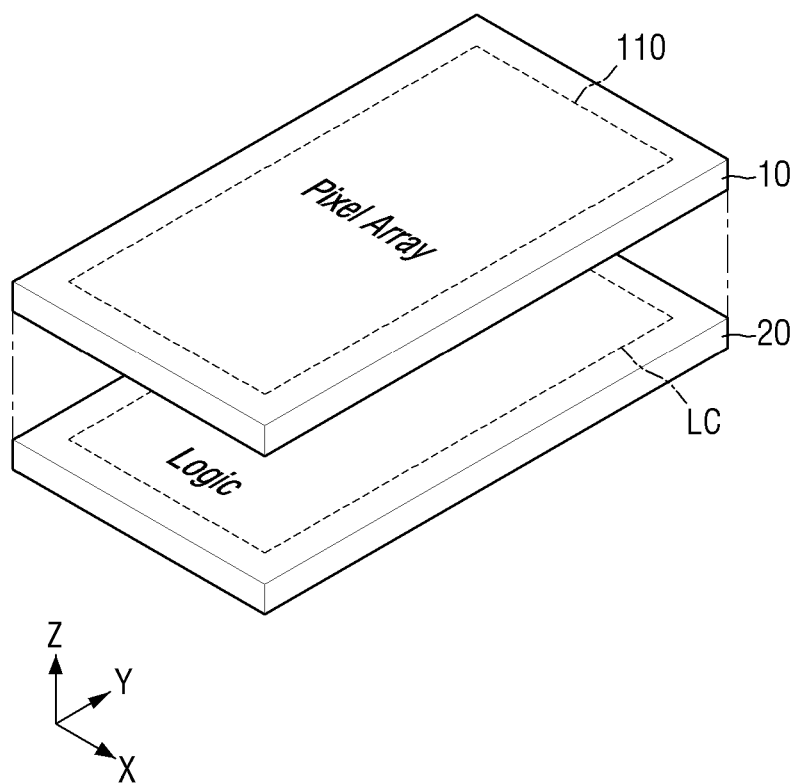
FIG. 11 is a schematic diagram for explaining an image sensor according to some embodiments.

FIG. 11 is a block diagram for explaining an image sensor according to some embodiments.

Referring to FIG. 11, the image sensor 100 according to an embodiment may include a first chip 10 and a second chip 20 that are stacked. The second chip 20 may be stacked on the first chip 10, for example, in a third direction Z. The first chip 10 and the second chip 20 may be electrically connected to each other. The pixel signal (data) transferred from the first chip 10 may be transferred to the logic region LC.

The first chip 10 may include a pixel array (112 of FIG. 1). The second chip 20 may include a logic circuit region LC, a memory region, and the like. The logic circuit region LC may include a plurality of elements for driving a pixel signal (data). The logic circuit region LC may include, for example, the row driver 120, the correlated double sampling block 130, the ramp signal generator 150, the timing generator 160, the control register block 170, the buffer 180 of FIG. 1, and the like.

Figure 12:
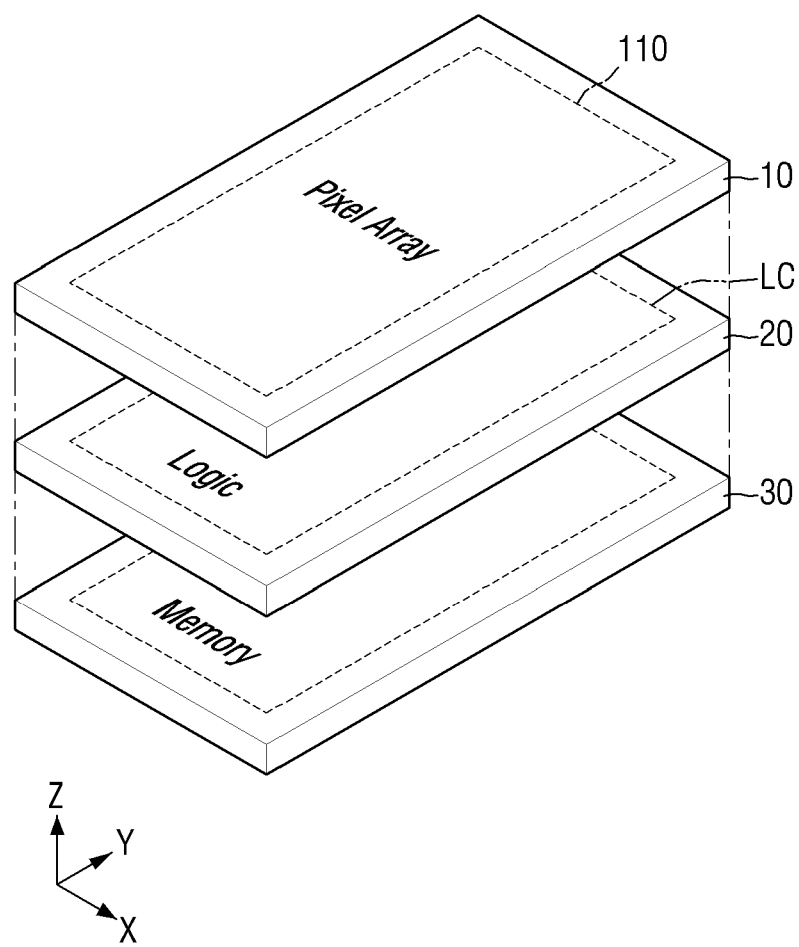
FIG. 12 is a schematic diagram for explaining an image sensor according to some embodiments.

FIG. 12 is a block diagram for explaining an image sensor according to some embodiments.

For convenience of explanation, points different from those described referring to FIG. 11 will be mainly described.

Referring to FIG. 12, an image sensor 100' may further include a third chip 30. The third chip 30, the second chip 20, and the first chip 10 may be sequentially stacked in the third direction Z. The third chip 30 may include a memory device. For example, the third chip 30 may include a volatile memory device such as a DRAM or a SRAM. The third chip 30 may receive signals from the first chip 10 and the second chip 20 and process the signals through the memory device.

In concluding the detailed description, those of ordinary skill in the pertinent art will appreciate that many variations and modifications may be made to the described embodiments without substantially departing from the principles of the present disclosure. Therefore, the described embodiments of the present disclosure are used in a generic and descriptive sense and not for purposes of limitation.

What is claimed is:

1. An image processing device comprising:
   an image sensor having a plurality of unit groups, each unit group comprising a reference group and a conversion group each including a plurality of pixels and a plurality of color filters, the image sensor configured to generate image data using the plurality of pixels; and
   an image signal processor configured to calculate a hash of the image data, and to select a filter corresponding to the hash to perform filtering,
   wherein the image signal processor includes:
      a pixel index converter configured to convert indexes of the plurality of pixels based on a positional relationship between the plurality of pixels,
      a pixel property converter configured to convert the hash and properties of the plurality of pixels, and
      a filter coefficient converter configured to convert filter coefficients of the plurality of pixels based on the respective converted pixel index and the respective converted pixel property,
   wherein the conversion group includes a plurality of conversion regions, and the pixel index converter is configured to convert a pixel index of each of the plurality of conversion regions into a pixel index of the reference group based on a respective positional relationship.

2. The image processing device of claim 1, wherein the pixel index converter is configured to convert the pixel index of the conversion group into the pixel index of the reference group based on a first positional relationship.

3. The image processing device of claim 2, wherein the conversion group includes first to third conversion regions, the pixel index converter is configured to:
   convert a first 1 pixel index of the first conversion region into a second_1 pixel index of the reference group based on a first_1 positional relationship,
   convert a first 2 pixel index of the second conversion region into a second_2 pixel index of the reference group based on a first_2 positional relationship, and
   convert a first 3 pixel index of the third conversion region into a second_3 pixel index of the reference group based on a first_3 positional relationship.

4. The image processing device of claim 1, wherein the pixel index converter is configured to convert the first pixel index of the reference group into a second pixel index of the reference group based on a second positional relationship.

5. The image processing device of claim 1, wherein the pixel property converter is configured to convert the properties of the plurality of pixels based on a slope property, and to convert the hash before conversion of the properties.

6. The image processing device of claim 1, wherein the pixel property converter is configured to convert the pixel property of the conversion group into the pixel property of the reference group based on the positional relationship, and to convert the hash before conversion of the pixel property.

7. The image processing device of claim 1, wherein the filter coefficient converter is configured to convert the filter coefficient of the conversion group into the filter coefficient of the reference group based on the positional relationship.

8. The image processing device of claim 1, wherein the image signal processor quantizes a first slope property corresponding to the first pixel index of the conversion group and assigns the first slope property to the first hash,
   the pixel index converter is configured to convert the first pixel index into the pixel index of the reference group based on a first positional relationship, and
   the pixel property converter is configured to convert the first slope property into a second slope property of the reference group based on the first positional relationship, and to convert the first hash into a second hash corresponding to the second slope property.

9. The image processing device of claim 8, wherein the image signal processor is configured to apply a filter of the reference group to the converted first pixel index and the converted first slope property to perform filtering.

10. The image processing device of claim 1, wherein the plurality of unit groups include the same color filters arranged in an M*N matrix, where M and N are natural numbers.

11. An image processing device comprising:
    an image sensor which includes a plurality of unit groups comprising a center group and a peripheral group each including a plurality of pixels and a plurality of color filters; and
    an image signal processor which is configured to calculate a hash of a pixel property based on brightness or slope information of a raw image generated from the plurality of pixels,
    wherein the image signal processor includes a pixel index converter which is configured to convert indexes of the plurality of pixels using a positional relationship between the plurality of pixels, a pixel property converter which is configured to convert the properties of the plurality of pixels, and a filter coefficient converter which is configured to convert filter coefficients of the plurality of pixels based on the respective converted pixel index and the respective converted pixel property, wherein the filter of the center group corresponding to the calculated hash is configured to be applied to the converted pixel index and pixel property to perform filtering, wherein the image signal processor quantizes a first slope property corresponding to a first pixel index of the peripheral group and assigns the first slope property to a first hash, and the pixel index converter is configured to convert the first pixel index into a pixel index of the center group based on a first positional relationship.

12. The image processing device of claim 11, wherein the pixel index converter is configured to convert the pixel index of the peripheral group into the pixel index of the central group based on the positional relationship.

13. The image processing device of claim 11, wherein the pixel property converter is configured to convert the pixel property of the peripheral group into the pixel property of the central group using the positional relationship, and to convert a hash before conversion.

14. The image processing device of claim 11, wherein the filter coefficient converter is configured to convert the filter coefficient of the peripheral group into the filter coefficient of the central group based on the positional relationship.

15. The image processing device of claim 11, wherein the pixel property converter is configured to convert the first slope property into a second slope property of the center group using the first positional relationship, and to convert the first hash into a second hash corresponding to the second slope property.

16. The image processing device of claim 15, wherein the image signal processor is configured apply a filter of the center group to the converted first pixel index and the converted first slope property to perform the filtering.

17. The image processing device of claim 11, wherein the plurality of unit groups include same color filters arranged in an M*N matrix, where M and N are natural numbers.

18. An image processing method of an image processing device comprising:

an image sensor made up of a reference group and a conversion group each including a plurality of pixels and a plurality of color filters, and an image signal processor which calculates a hash of a pixel property based on brightness or slope information of a raw image generated from the plurality of pixels to perform filtering, wherein the conversion grow includes a plurality of conversion regions, and the image signal processor converts a pixel index of each of the plurality of conversion regions into a pixel index of the reference group based on a respective positional relationship between the plurality of pixels, wherein the image signal processor converts pixel properties for the plurality of pixels of the conversion group into pixel properties for the plurality of pixels of the reference group based on the positional relationship between the plurality of pixels, and wherein the image signal processor converts filter coefficients of the plurality of pixels based on the respective converted pixel index and the respective converted pixel property.

19. The image processing method of claim 18, wherein the image signal processor quantizes the pixel property corresponding to the pixel index.

20. The image processing method of claim 18, wherein the image signal processor applies a filter of the reference group corresponding to the calculated hash to the converted pixel index and pixel property to perform the filtering.

* * * * *